(12) United States Patent
Kang et al.

(10) Patent No.: US 12,460,921 B2
(45) Date of Patent: Nov. 4, 2025

(54) METROLOGY 3D SCANNING SYSTEM AND METHOD

(71) Applicant: ARIS TECHNOLOGY LLC, Batavia, IL (US)

(72) Inventors: Mingu Kang, Chicago, IL (US); Levi Armstrong, Kerrville, TX (US); Matthew M. Robinson, San Antonio, TX (US); Marc Alban, San Antonio, TX (US); Brad Johnson, Plainfield, IL (US); James Clark, Baden, PA (US)

(73) Assignee: ARIS TECHNOLOGY LLC, Batavia, IL (US)

( * ) Notice: Subject to any disclaimer, the term of this patent is extended or adjusted under 35 U.S.C. 154(b) by 420 days.

(21) Appl. No.: 18/183,767

(22) Filed: Mar. 14, 2023

(65) Prior Publication Data
US 2023/0375334 A1 Nov. 23, 2023

Related U.S. Application Data

(60) Provisional application No. 63/343,435, filed on May 18, 2022.

(51) Int. Cl.
  *G01B 11/25* (2006.01)
  *B25J 9/16* (2006.01)
  (Continued)

(52) U.S. Cl.
  CPC ............ *G01B 11/25* (2013.01); *B25J 9/1666* (2013.01); *B25J 9/1697* (2013.01); *G09G 3/003* (2013.01);
  (Continued)

(58) Field of Classification Search
None
See application file for complete search history.

(56) References Cited

U.S. PATENT DOCUMENTS

| | | | | |
|---|---|---|---|---|
| 7,804,602 B2 * | 9/2010 | Raab | ...................... | G01B 21/04 356/614 |
| 2011/0288684 A1 * | 11/2011 | Farlow | .................. | B25J 19/023 901/1 |

(Continued)

FOREIGN PATENT DOCUMENTS

| | | | | |
|---|---|---|---|---|
| CA | 3117796 A1 * | 5/2020 | ............. | G06V 20/64 |
| WO | WO-2022100960 A1 * | 5/2022 | ............... | G06T 7/68 |

*Primary Examiner* — Ted W Barnes
(74) *Attorney, Agent, or Firm* — MARSHALL, GERSTEIN & BORUN LLP

(57) ABSTRACT

A metrology three-dimensional (3D) scanning system includes a metrology 3D scanning application (app) comprising computing instructions that, when executed by one or more processors, causing the one or more processors to: record human-robot interaction (HRI) data as a human operator operates the HRI device; generate a preliminary scan path based on the HRI data for operating a robotic element within an operating environment; move the robotic element along at least a portion of the preliminary scan path and record preliminary scan data comprising at least a subset of dimension data defining at least a target object; generate a metrology scanning path plan and a motion plan for the robotic element based on the preliminary scan data; and execute instructions to move the robotic element within the operating environment according to the metrology scanning path plan and the motion plan for scanning the target object.

20 Claims, 6 Drawing Sheets

(51) Int. Cl.
*G09G 3/00* (2006.01)
*G01N 21/01* (2006.01)
*G01N 21/17* (2006.01)

(52) U.S. Cl.
CPC ........... *G01N 2021/0118* (2013.01); *G01N 2021/0181* (2013.01); *G01N 2021/1785* (2013.01)

(56) References Cited

U.S. PATENT DOCUMENTS

| | | | | |
|---|---|---|---|---|
| 2013/0100282 | A1* | 4/2013 | Siercks | G01B 11/25 348/135 |
| 2014/0028805 | A1* | 1/2014 | Tohme | G01B 11/2518 348/47 |
| 2014/0168370 | A1* | 6/2014 | Heidemann | G01B 11/2518 348/46 |
| 2014/0268093 | A1* | 9/2014 | Tohme | G01S 17/48 356/3.08 |
| 2015/0075018 | A1* | 3/2015 | Bridges | G05B 19/401 33/503 |

\* cited by examiner

METROLOGY 3D SCANNING SYSTEM AND METHOD

CROSS-REFERENCE TO RELATED APPLICATIONS

This application claims priority to U.S. Provisional Patent Application No. 63/343,435, entitled "Metrology 3D Scanning System and Method" and filed May 18, 2022, the entire disclosure of which is hereby incorporated by reference herein.

STATEMENT REGARDING FEDERALLY SPONSORED RESEARCH OR DEVELOPMENT

This invention was made with government support under Advanced Robotics for Manufacturing Institute Subaward Agreement No. ARM-TEC-19-04-F04 awarded by the U.S. Army Contracting Command. The government has certain rights in the invention.

FIELD OF THE INVENTION

This disclosure relates generally to metrology three-dimensional scanning systems and methods and, more particularly, to metrology 3D scanning systems and methods for generating scanning path and motion plans for specific objects using human-robot interaction.

BACKGROUND

Currently, when 3D measurement is performed for metrology applications, such as quality inspection, well-defined (accurate, precise, stable, etc.) fixturing and target object placement is needed. When a sensor is used manually to inspect target objects, it takes significant time and effort by the human operator to move the sensor to all the desired locations to collect measurement data. This manual process is very slow and error prone, and thus robotic automation of sensing is desired. However, to robotically automate sensing, fixturing scheme(s) have to be developed to hold target object(s), robot program(s) have to be created by human recording each location that a robot has to visit one-by-one to preempt collision during the robot's motion across multiple robot locations based on human expertise or by testing the robot program very slowly while force-stopping the robot motion in anticipation of collision. Furthermore, the skill set needed to perform this robotic programming is hard to find from someone who knows how to perform metrology, and thus a seemingly great robot program may not result in a reasonable measurement outcome, or the desired locations from the perspective of a metrology expert may not be accomplishable by a robot.

SUMMARY

In accordance with one exemplary aspect of the present invention, a metrology three-dimensional (3D) scanning system configured to generate scanning path and motion plans for specific objects using human-robot interaction (HRI) comprises a computer memory, one or more processors communicatively coupled to the computer memory, an HRI device, and a robotic element, and a metrology 3D scanning application (app) comprising computing instructions configured to execute on the one or more processors. The metrology 3D scanning app, when executed by the one or more processors, causes the one or more processors to: record HRI data as a human operator operates the HRI device; generate a preliminary scan path based on the HRI data for operating the robotic element within an operating environment; execute instructions to move the robotic element along at least a portion of the preliminary scan path and record, by the one or more processors into the computer memory, preliminary scan data comprising at least a subset of dimension data defining at least a target object; generate a metrology scanning path plan and a motion plan for the robotic element based on the preliminary scan data; and execute instructions to move the robotic element according to the metrology scanning path plan and the motion plan for scanning the target object, wherein the metrology scanning path plan and the motion plan, when implemented for scanning the target object, causes the robotic element to move within the operating environment.

In further accordance with any one or more of the foregoing exemplary aspects of the present invention, a metrology 3D scanning system may further include, in any combination, any one or more of the following preferred forms.

In one preferred form, the human operator operates an HRI device to define a collision zone in a proximity to a target object, wherein the collision zone comprises a 3D area that the robotic element should avoid physical entry into when operating within an operating environment and the preliminary scan path is generated for operating the robotic element within the operating environment while avoiding the collision zone.

In another preferred form, the HRI device comprises an augmented reality (AR) device.

In another preferred form, the AR device renders a 3D representation of the target object on a display of the AR device, and wherein at least a portion of the 3D representation is marked as a missing or incomplete portion by the human operator, and wherein the missing or incomplete portion is added to the subset of dimension data defining the target object.

In another preferred form, the collision zone comprises a virtual near-net shape augmented reality (AR) bounding box that is generated via hand or gazing by the human operator using the HRI device and the HRI device comprises an AR device.

In another preferred form, the metrology 3D scanning app is configured to generate a localized 3D model of the target object by aligning the subset of dimension data as defined in the preliminary scan data to a 3D model of the target object.

In another preferred form, the 3D model comprises a 3D reference design.

In another preferred form, a dilated surface around the target object is determined, wherein the dilated surface is a surface defined where a signed distance field to the target object is equal to a dilation distance, wherein a distance of a coordinate is a minimum distance to any surface of the target object.

In another preferred form, aligning the subset of dimension data to a 3D reference design of the target object further comprises determination of an alignment deviation having an alignment preset threshold defining whether alignment between the subset of dimension data and the 3D reference design resulted in an alignment success or an alignment failure.

In another preferred form, the alignment deviation compared to the alignment preset threshold indicates the alignment failure has occurred, an additional 3D scan of the target object is captured, and the additional 3D scan is used to align to the 3D reference design.

In another preferred form, the alignment deviation compared to the alignment preset threshold indicates the alignment failure has occurred, and the human operator manipulates the HRI device to map points from the subset of dimension data and the 3D reference design to align the subset of dimension data and the 3D reference design.

In another preferred form, scanning of the target object generates an insufficient metrology scan data, and wherein the human operator manipulates the HRI device to collect additional metrology scanning data including generation of watertight mesh.

In another preferred form, the HRI data and the preliminary scan data are selected as training data for input into an artificial intelligence (AI) algorithm for training an AI model and the AI model is configured to output a more effective metrology scanning path and motion plan or sufficient metrology data including watertight completeness data for inspecting or manufacturing.

In another preferred form, the metrology 3D scanning app is configured to determine defects of the target object after scanning of the target object.

In another preferred form, the metrology 3D scanning app is configured to create a visual representation of the target object with an indicator of the defects.

In another preferred form, the metrology 3D scanning app is configured to determine whether the target object requires maintenance or repair after scanning of the target object.

In another preferred form, the metrology scanning path plan and the motion plan are provided to a second robotic element for scanning of a new target object by the second robotic element.

In accordance with another exemplary aspect of the present invention, a metrology three-dimensional (3D) scanning method for generating scanning path and motion plans for specific objects using human-robot interaction (HRI) comprises the steps of: recording, by one or more processors, HRI data as a human operator operates an HRI device; generating, by the one or more processors, a preliminary scan path based on the HRI data for operating the robotic element within an operating environment; executing, by the one or more processors, instructions to move the robotic element along at least a portion of the preliminary scan path and record, by the one or more processors into a computer memory, preliminary scan data comprising at least a subset of dimension data defining at least a target object; generating, by the one or more processors, a metrology scanning path plan and a motion plan for the robotic element based on the preliminary scan data; and executing, by the one or more processors, instructions to move the robotic element according to the metrology scanning path plan and the motion plan for scanning the target object, wherein the metrology scanning path plan and the motion plan, when implemented for scanning the target object, causes the robotic element to move within the operating environment.

In accordance with another exemplary aspect of the present invention, a tangible, non-transitory computer-readable medium stores instructions for generating scanning path and motion plans for specific objects using human-robot interaction (HRI), that when executed by one or more processors cause the one or more processors to: record HRI data as a human operator operates an HRI device; generate a preliminary scan path based on the HRI data for operating the robotic element within an operating environment; execute instructions to move the robotic element along at least a portion of the preliminary scan path and record, by the one or more processors into a computer memory, preliminary scan data comprising at least a subset of dimension data defining at least a target object; generate a metrology scanning path plan and a motion plan for the robotic element based on the preliminary scan data; and execute instructions to move the robotic element according to the metrology scanning path plan and the motion plan for scanning the target object, wherein the metrology scanning path plan and the motion plan, when implemented for scanning the target object, causes the robotic element to move within the operating environment.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown.

Figure 1:
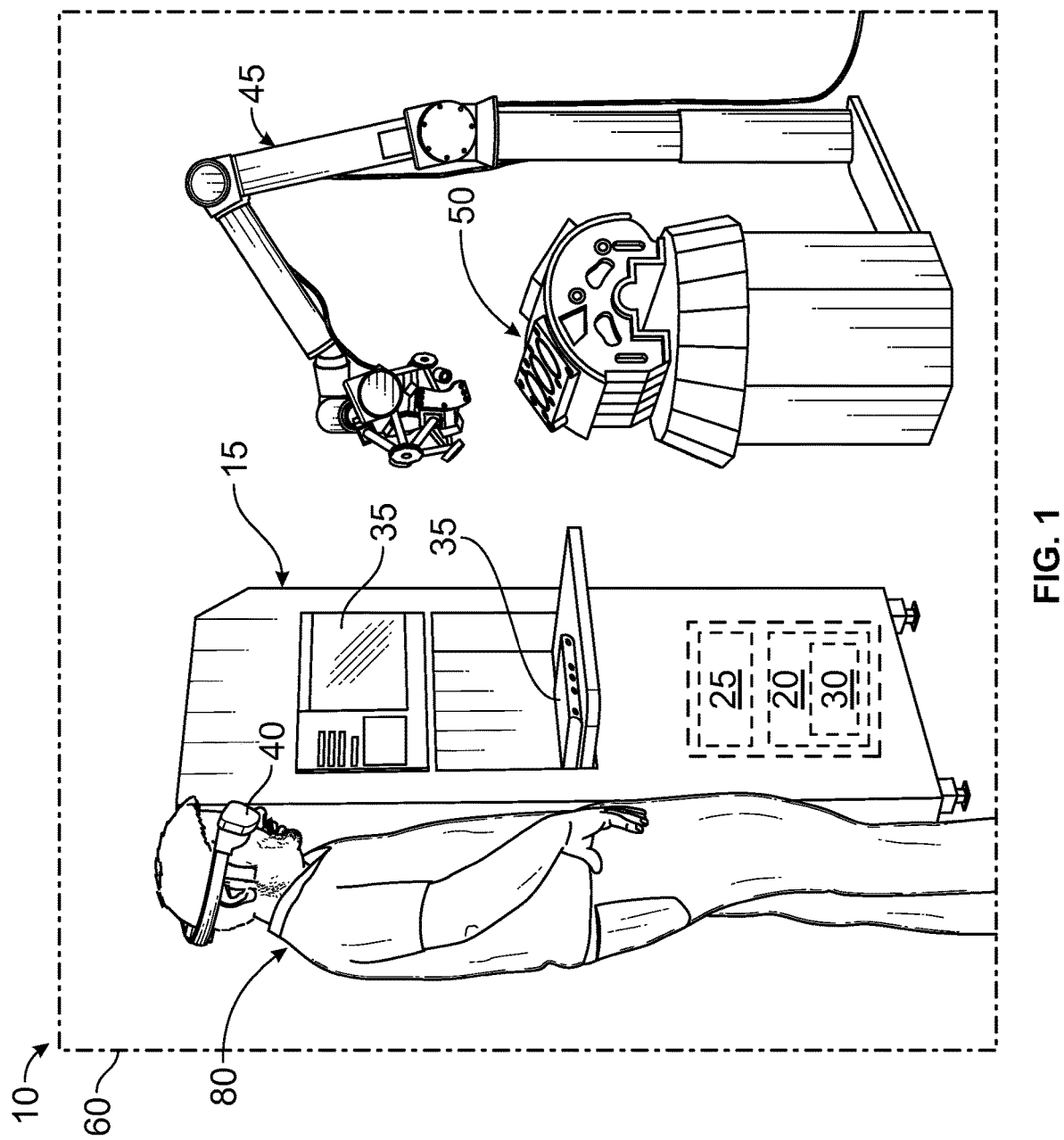
FIG. 1 is an illustration of an example metrology 3D scanning system.
Figure 2:
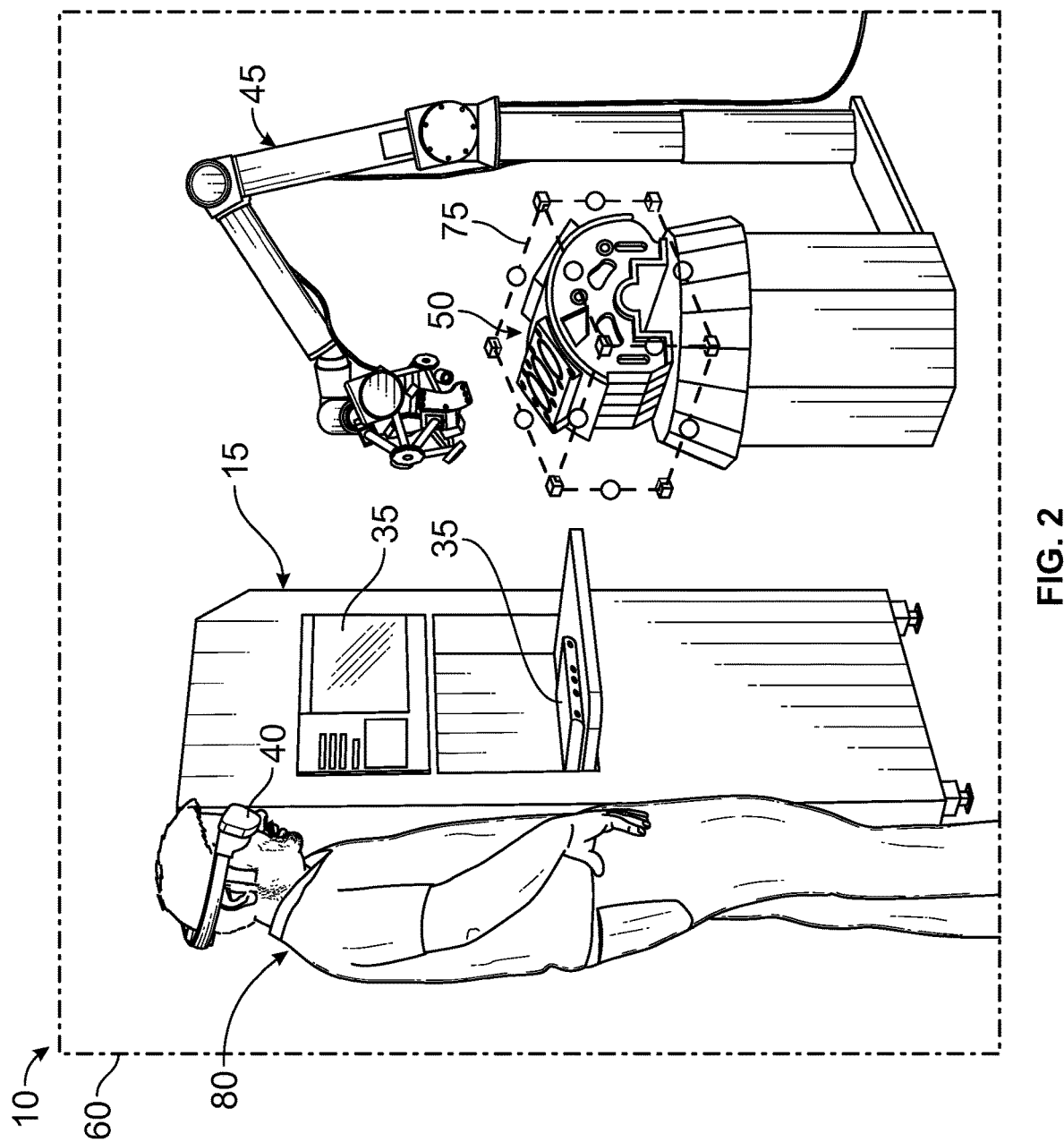
FIG. 2 is an illustration of the metrology 3D scanning system of FIG. 1 showing an example collision zone.
Figure 3:
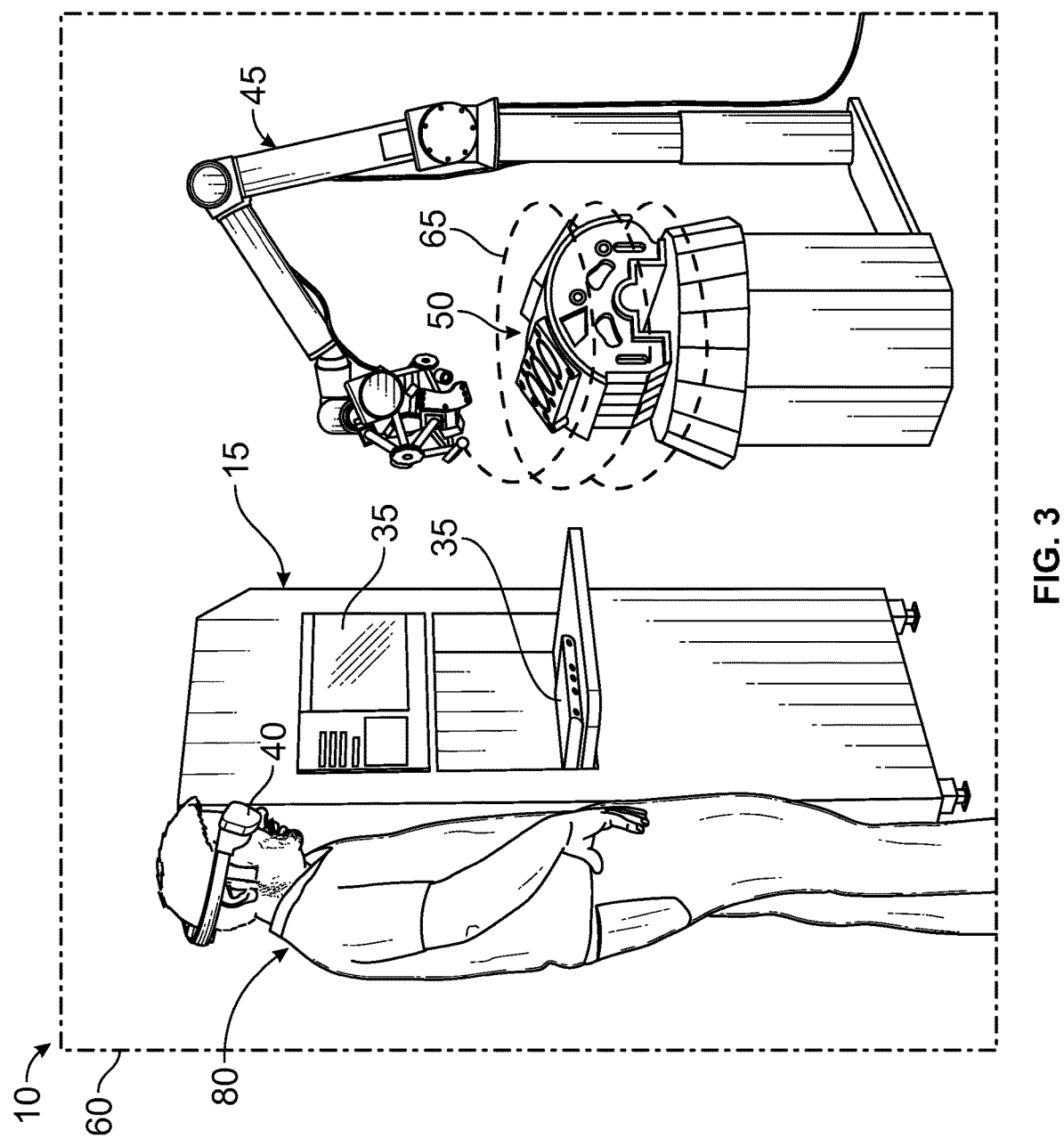
FIG. 3 is an illustration of the metrology 3D scanning system of FIG. 1 showing an example preliminary scan path.
Figure 4:
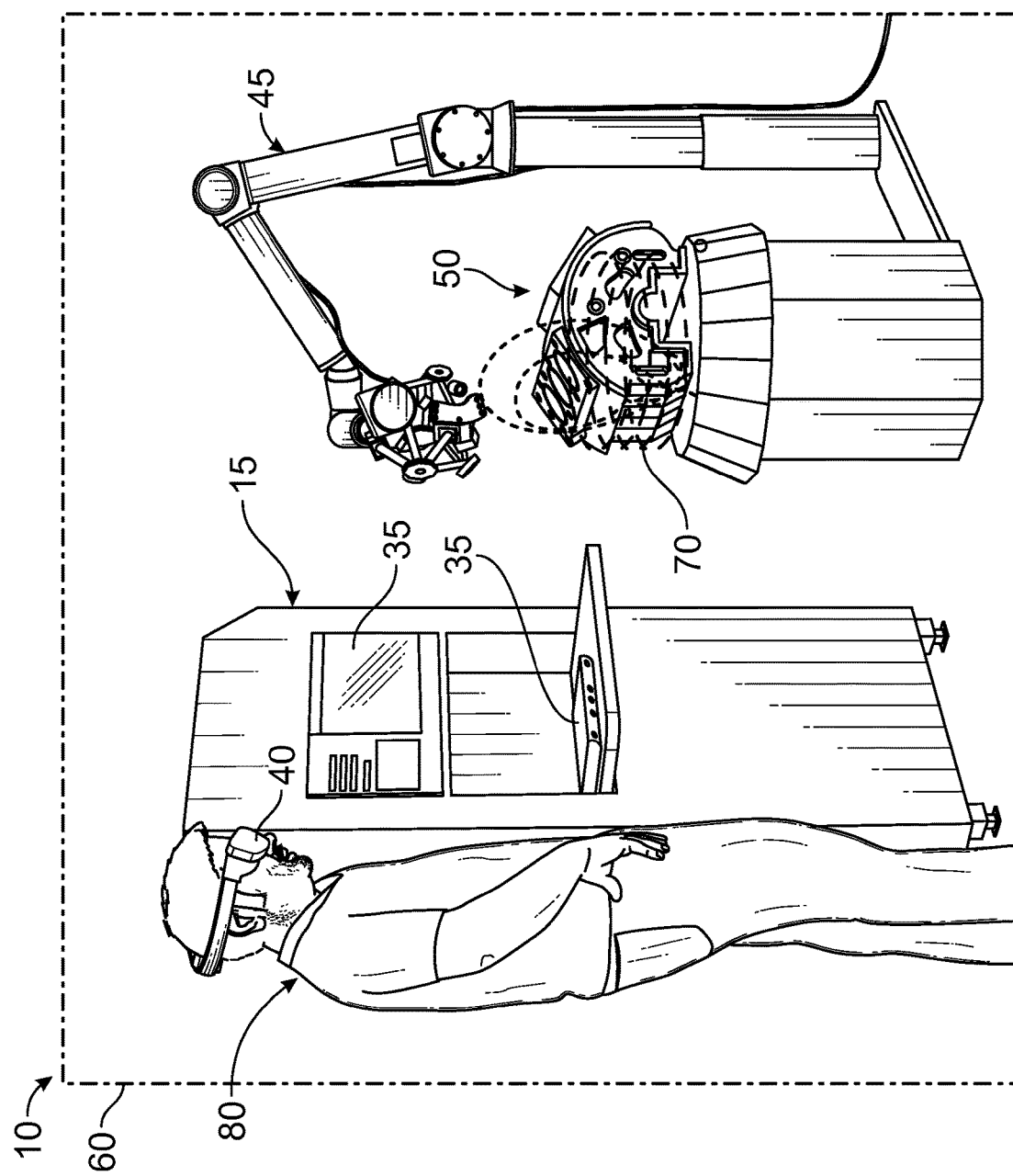
FIG. 4 is an illustration of the metrology 3D scanning system of FIG. 2 showing an example metrology scanning path.

The Figures depict preferred embodiments for purposes of illustration only. Alternative embodiments of the systems and methods illustrated herein may be employed without departing from the principles of the invention described herein.

DETAILED DESCRIPTION

Referring to FIGS. 1-4, an example metrology three-dimensional (3D) scanning system 10 can be located within an operating environment 60, such as an area in a manufacturing facility, a sustainment (e.g., maintenance and repair) facility, a logistics facility (e.g., distribution center), or any other indoor or outdoor space where a physical object's dimension is measured for metrology applications such as quality inspection, and is configured to perform a 3D scanning method to generate scanning path and motion plans for specific objects using human-robot interaction (HRI). Metrology 3D scanning system 10 generally includes a computing device 15, one or more HRI device(s) 40 in communication with computing device 15 through a wired or wireless connection, and one or more robotic element(s) 45 in communication with computing device 15 through a wired or wireless connection.

Computing device 15 can be any type of computing device, such as a computer, laptop computer, workstation, tablet, etc. and includes: a computer memory 20; one or more processors 25, such as CPUs, GPUs, etc., that are communicatively coupled to computer memory 20, to HRI device 40, and to robotic element 45; and one or more input/output devices 35, such as keyboards, displays, touchscreens, etc. Processors 25 can be on-site processors and/or one or more processors of cloud based servers.

In the example shown, HRI device 40 is an augmented reality (AR) device, but could also be a haptic device, a hand-held object with vision tracked marker or laser tracked object, the robotic element itself manipulated using hand-guided motion planning, or any other HRI device that can be used to provide input that can be used by metrology 3D scanning app 30 to generate scanning paths and motion plans.

Robotic element 45 is a combination of a motorized system that can move a sensor mounted on the motorized system and/or pick up and move the part being measured in front of sensor(s) when an instruction is provided. For example, robotic element 45 could be a 6-axis robotic arm, such as that manufactured by Universal Robots, a 2-axis horizontal turntable, such as that manufactured by Parker, and a multi-line laser 3D scanner by Creaform. Robotic element 45 may be able to move and manipulate the sensor around the target object or the target object around sensor. Both target or the sensor can be static or in motion in a given point of time.

Figure 6:
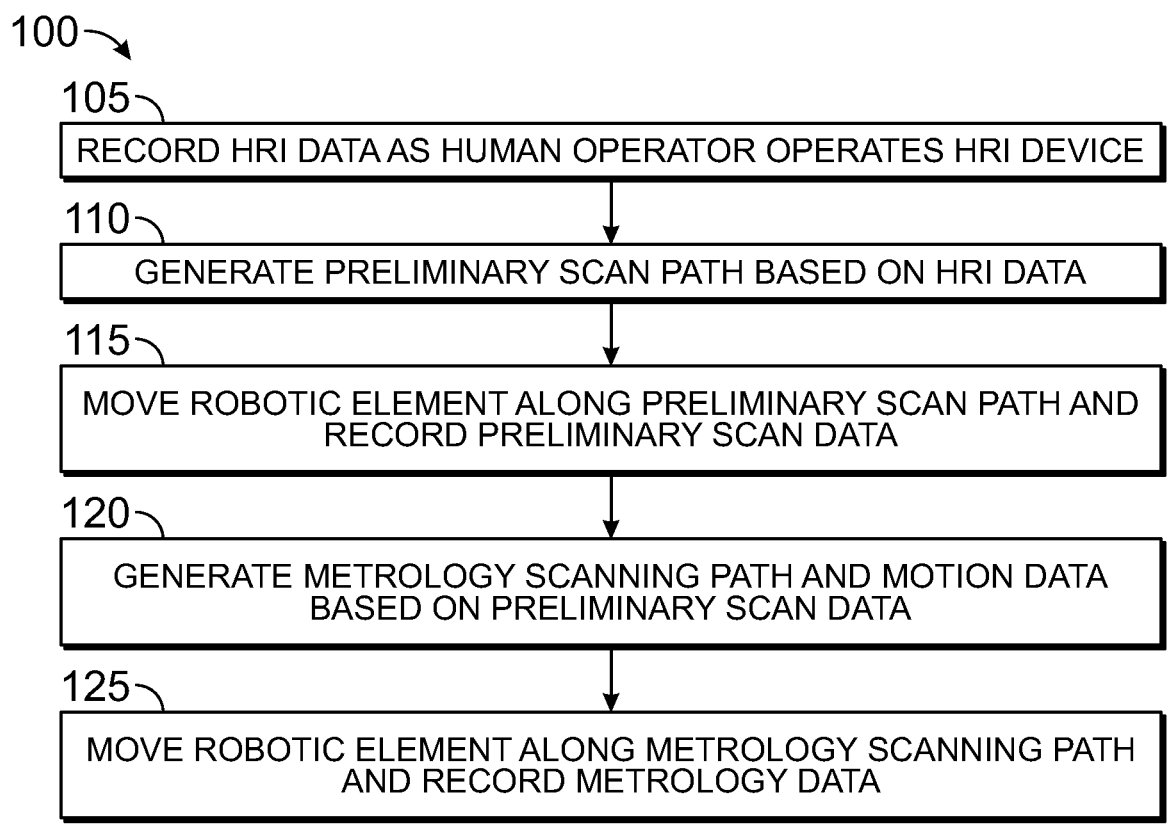
FIG. 6 is a flowchart of an example metrology 3D scanning method.

A metrology 3D scanning application (app) 30 can be stored in computer memory 20 or on any tangible, non-transitory computer-readable medium and can include computing instructions configured to be executed on processor(s) 25 to execute the metrology 3D scanning method. Metrology 3D scanning app 30, when executed on processor(s) 25, can execute the metrology 3D scanning method and cause processor(s) 25 to perform various steps to generate scanning paths and motion plans for scanning and inspection of a target object 50 located within operating environment 60. For example, referring to FIG. 6, an example metrology 3D scanning method 100 that can be performed by metrology 3D scanning app 30 when executed on processor(s) 25 is shown.

At step 105 of metrology 3D scanning method 100, HRI data: can be received by metrology 3D scanning app 30 on computing device 15 from HRI device 40 and processor(s) 25 can record the HRI data, for example in computer memory 20, as a human operator 80 operates HRI device 40. HRI data can be: (1) outcome data in a form of coordinate locations that define the vertices of rectangular bounding boxes that human operator 80 drew by loading, grabbing, dragging, dropping, and uniformly or non-uniformly scaling, whereas target object 50 is encompassed by only one box or by multiple boxes to encompass target object 50 more near-net shape (i.e., the surplus volume between the target object's surface and the box is smaller than using just one box, almost like a aggregation of Lego blocks that mimic a realistic object shape); (2) outcome data in a form of scan surface on which scan path(s) (i.e., location that a sensor has to visit and the sequence of the locations) will be generated, whereas the scan surface would contain the sensor's orientation information for each location that is generated on the surface [x, y, z, w, p, r]. For example, human operator 80 can operate HRI device 40 to define a collision zone 75 (see FIG. 2) around and in proximity to target object 50. Collision zone 75 preferably defines a 3D area around target object 50 that robotic element 45 should avoid physical entry into when operating in operating environment 60 to avoid collision with target object 50 or other potential objects within operating environment 60, such as the surface/stand that target object 50 is positioned on. For example, when HRI device 40 is an AR device, collision zone 75 can include a virtual near-net shape AR bounding box that is generated via hand or gazing by human operator 80 using HRI device 40 or can be automatically generated using previously existing sensing data collected before the preliminary scan process using HRI device 40. As an example, rough dimensional information may be collected on target object 50 from 2D cameras (e.g., even security cameras) that can inform the rough size and location and possibly shape of target object 50. Metrology 3D scanning app 30 may receive this information and dilate the rough 3D representation of target object 50 and use the dilated surface as-is as the collision zone or automatically generate the bounding box around the dilated surface particularly if there are missing surface dimensions even after dilating the rough dimensional information. A dilated surface is a surface defined where a signed distance field to the target object is equal to a dilation distance, wherein a distance of a coordinate is a minimum distance to any surface of the target object. When such rough dimensional information from previously existing sensing data is not available and connected to the system, the preliminary scanning process using HRI device 40 is used.

Alternatively, a particular type of sensor may be mounted on robotic element 45 (if so, there may be a tool changing capability where sensors can be swapped in and out) or a static sensor may have the capability to capture the 3D data on target object 50 from far away (i.e., longer stand-off distance and possibly larger field of view), which will allow robotic element 45 to perform a simple-motion from afar (or even safer if this sensor is statically placed). This sensor could be dedicated for preliminary scanning (instead of using the metrology scanner for the preliminary scanning as well) and will likely be cheaper and possibly faster while capturing lower-accuracy/lower-resolution data. In this case, the user would choose a few locations using robot element 45 by hand-guiding it to vertices of collision zone 75 (which is just another HRI device 40 manipulation to set up collision zone 75), and then perform the scan path and motion planning. The case of not performing collision zone setup using HRI device 40 most likely will make sense when there is sufficient pre-existing rough 3D representation of target object 50, which can algorithmically (autonomously) lead to a collision zone (using approaches like dilation). When there is too partial information that has been collected on target object 50, dilation may not lead to an encompassing dimension of target object 50, and so such approach would make sense when high-coverage but low-quality data is collected.

Figure 5:
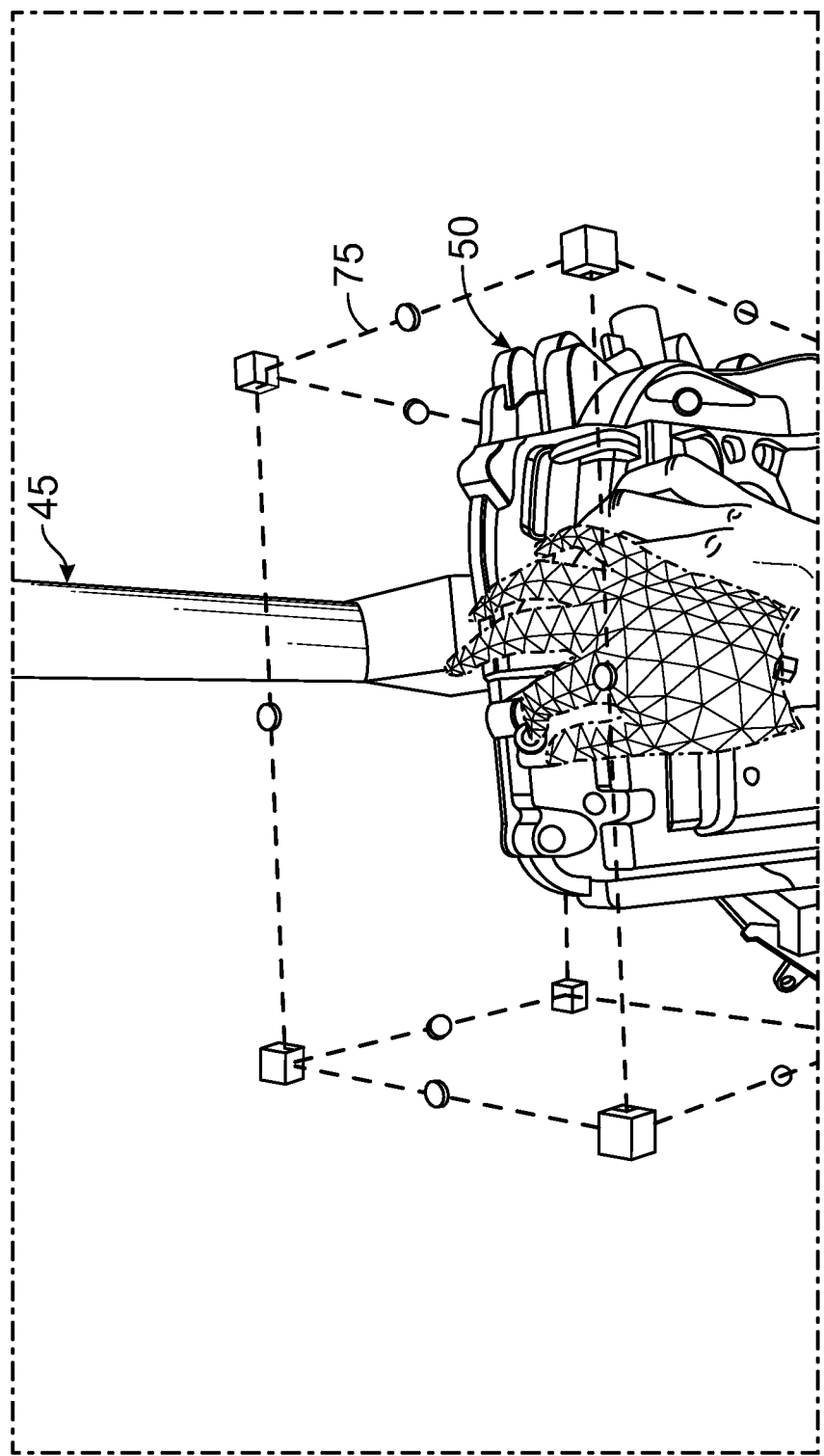
FIG. 5 is an illustration of the view through an HRI device of an example target object and an example collision zone.

Once the HRI data has been recorded, at step 110, metrology 3D scanning app 30 can generate a preliminary scan path 65 (see FIGS. 3 and 5) based on the HRI data. Preliminary scan path 65 can include instructions for operating robotic element 45 within operating environment 60. For example, if collision zone 75 were defined, as discussed above, preliminary scan path 65 can be generated to operate robotic element 45 within operating environment 60 while avoiding collision zone 75 defined by human operator 80 using HRI device 40. For example, using HRI device 40, human operator 80 can generate scan surface(s) on which scan path(s) (i.e., locations that sensor on robotic element 45 have to visit and the sequence of the locations) will be generated. Human operator 80 may wear AR glasses and using his/her hand to generate a 3-dimensional ellipsoid, similar to how bounding boxes are set up by loading, grabbing, dragging, dropping, and uniformly or non-uniformly scaling the vertices of the rectangular bounding box that defines the inner-ellipsoid. While HRI device 40 manipulation is similar, the human intent and the approach is different, which results in a different set of HRI data compared to the collision zone setup. As the intent is for human operator 80 to quickly and simply generate a preliminary scan path, HRI data is used to autonomously generate scan paths on the scan surface that human operator 80 generated using HRI device 40. Once the location, orientation, size, and shape of the ellipsoid(s) is defined, metrology 3D scanning app 30 may assume that the center of the ellipsoid defines the vector to which the sensor has to be pointing at when it is at one of the scan locations on the path computationally generated by the system on the scan surface defined by human operator 80. Additional HRI may be performed and HRI data collected by human operator 80 setting multiple center points that the sensor has to be facing at a given scan location, improving the measurement angle from the same scan location. For a very large object, creating an ellipsoid scan surface whose scan locations are facing the center(s) of the ellipsoid may not be optimal for an intuitive user experience, as a very large ellipsoid would have to be drawn using hands (e.g., a large flat surface). In this case, a very similar HRI process and HRI data type with the same device can be used by generating a different shape of scan surface. This scan surface may be 2D (X-Y plane) whose vector angles are all directly perpendicular to its 2D surface. The system may also use a different algorithm type to autonomously generate the scan sequence, such as a simple raster motion (e.g., left to right and then right to left). In all variations of the scan surface and path, robotic element 45 won't execute any motion whose target location or in-between location enters collision zone 75 defined by the bounding boxes.

At step 115, metrology 3D scanning app 30 executes instructions on processor(s) 25 and communicates with robotic element 45 to move robotic element 45 along at least a portion of, and preferably the entire, preliminary scan path 65 and preliminary scan data is recorded by processor(s) 25 into computer memory 20. The preliminary scan data preferably includes at least a subset of dimension data defining at least target object 50. Preliminary scan data can be 3D measurement data of target object 50, which is expected to be 3D scanned thoroughly using a high-quality/high-resolution sensor using robotic automation with a certain level of autonomy (full or partial). The scan data may be preliminary in that it may only represent subset the overall dimension of target object 50 or it has an insufficient accuracy/resolution to be used as replacement of 3D model to serve as collision zone 75 (i.e., near net shape) by itself or used for the metrology applications, such as comparing the preliminary scan to the engineering model (e.g., 3D CAD) to perform quality inspection. This scan data is also preliminary in that timing-wise, it precedes the metrology scan data, and so the intent of collecting the preliminary data is to save time, minimize manual effort, reduce risk, or improve intelligence in the overall workflow for the human operator to perform metrology scanning with the metrology 3D scanning system. The preliminary scan data can be in various formats including, point cloud of the object surface, mesh of the object surface, parametric representation of the part dimension, 3D point cloud or mesh constructed from 2D image and/or depth sensors, a multitude of 2D dissection data such as X-ray or CT images defining the overall dimension of the object when compiled into one coordinate system. As robotic element 45 moves along preliminary scan path 65, one or more sensors of robotic element 45 can capture the subset of dimension data defining target object 50, for example by reconstructing two-dimensional (2D) data into 3D, capturing a 3D surface, registering 2D dissection images, etc. Typically, full dimension data for target object 50 is not collected since target object 50 will typically be set on a surface/stand for inspection and dimension data for the portion of target object 50 that is on surface/stand cannot be obtained. In addition, as robotic element 45 follows preliminary scan path 65, in addition to collecting dimension data of target object 50, dimension data of surface/stand may also be collected as the lower portion of target object 50 is scanned.

If preliminary scan path 65 is not available, metrology 3D scanning app 30 can instruct robotic element 45 to perform a global "simplified" sensing, which can be accomplished with an industrial 3D scanner, low-resolution/low accuracy depth sensors, or 2D imaging that generate a simple measurement path based on collision zone 75. This global "simplified" sensing can be considered a preliminary scan and can be accomplished by a stationary sensor from a single location/orientation, a robotically movable sensor moving around target object 50, moving/rotating target object 50 in front of a static sensor, or any combination of the foregoing. The global "simplified" sensing process may be iterative, as a first global "simplified" sensing may not capture the full dimensions of target object 50 or may not even capture sufficient coverage of target object 50 to serve as a "preliminary scan". For example, a dilation approach could be used to revise/augment a prior global "simplified" sensing. Using the subset of dimensional data obtained in the prior global "simplified" sensing, a dilated surface, which is an artificially generated surface outside of the scan data, with a more smooth, rounded, averaged surface, around target object 50 can be determined which is typically is the surface defined where the signed distance field to the target object is equal to the dilation distance, wherein the distance of a coordinate is the minimum distance to any surface of the target. This first attempt at "simplified" sensing allows sensing by the sensor of robotic element 45 to measure the part from closer to near-net shape as the dilated surface generated from an insufficient "simplified" sensing, which hence would be considered an insufficient preliminary scan. Compared to the previous attempt of "simplified" sensing this next iteration of sensing from the dilated surface will allow a more effective preliminary scan from improved scan distance, angle, point of view, etc.

Once the preliminary scan data has been recorded, HRI device 40, such as an AR device, and/or computing device 15 can render a 3D representation of target object 50 on a display of HRI device 40 or an output device 35 of computing device 15. Based on the 3D representation, human operator 80 can mark, indicate, or highlight as missing or incomplete at least a portion of the 3D representation using HRI device 40 or computing device 15 and metrology 3D scanning app 30 can instruct robotic element 45 to rescan the missing or incomplete portion 55 and new dimension data from the rescan can be added to the subset of dimension data defining target object 50. When there is a missing area based on the simulated scanning or actual scanning, human operator 80 can localize the missing area by using HRI device 40. One example would be to generate the scan surface only targeted for the local area with missing data. The other approach would be to identify the location of missing points/mesh by comparing the incomplete 3D scan data, which can be based on preliminary scan data or metrology scan data, to an engineering model (e.g., CAD file) and then sending robot element 45 to go to that area where no comparison data exists. Alternatively, iterative simplified sensing with improving dilated surface can be another method of accomplishing sufficient preliminary scan data.

In addition, metrology 3D scanning app 30 can be configured to generate a localized 3D model of target object 50, for example, a 3D representation of target object 50 located and oriented in the coordinate system of robotic element 45, by aligning the subset of dimension data as defined and recorded in the preliminary scan data to a 3D model of target object 50. Preferably, the 3D model of target object 50 is a 3D reference design, such an electronic drawing file of target object 50 or a golden 3D scan of target object 50, which is a complete and accurate 3D representation of target object 50 from a previous 3D measurement or a metrology effort on a different part with the same design. The alignment can first be attempted using a global best fit alignment. However, this alignment could possibly fail when target object 50 lacks features. This alignment failure can be recognized and corrected automatically or manually using HRI device 40. Aligning the subset dimension data to the 3D reference design of target object 50 can include comparing the preliminary scan data to the 3D reference design and determining an alignment deviation, which can be the size of the transformation metrics between the measurement data and the 3D reference design. The alignment deviation can be compared to an alignment preset threshold to define whether alignment between the subset of dimension data and the 3D reference design resulted in an alignment success or failure. Depending on the manufacturing process, there is an expected range of an alignment deviation. There may be a major error in certain sections of target object 50 which would be a manufacturing quality failure, but when target object 50 is made reasonably well, the global dimensional deviation between the dimension data and the 3D reference design post-alignment would likely be within a reasonably expected range. If the deviation, particularly across various subset of dimensions, exceeds the expected range, a failed alignment could be suspected. When a failed alignment is suspected, the input parameters to the global best fit alignment can be changed to find a new alignment with a different approach (e.g., changing the sequence of rotation or axis of rotation to reach an improved local minimum in the distance function), which may entail a more time consuming and costly computation. This may still not be sufficient particularly when there target object 50 is featureless or features are relatively insignificant to the global dimension data, and then the HRI data can be used for the alignment. One example would be for human operator 80 to pick three corresponding points on the dimension data and the 3D reference design.

If a comparison of the alignment deviation to the alignment preset threshold indicates that alignment failure has occurred, an additional 3D scan of target object 50 can be executed and the dimension data captured and recorded, registered to the previously collected dimension data, and the accrued dimension data from the additional 3D scan of target object 50 can be aligned to the 3D reference design of target object 50. Alternatively, human operator 80 can use HRI device 40 to map points, meshes, group of points or meshes, selectable area, features, etc., between the subset of dimension data and the 3D reference design to manually align the subset of dimension data and the 3D reference design. The wrongly aligned reference data can be visualized to human operator 80 through HRI device 40 and human operator 80 can perform alignment. As an example, human operator 80 may select 3 corresponding points or if the specific HRI device 40, such as AR glasses, don't allow accurate selection of a point, pointing and selecting a target point may define the surrounding dimension data (i.e., group of points or mesh) including the target point to be used for alignment. Alternatively, a similar HRI may be used to select a specific geometric feature to perform alignment, This selection can then be used as the reference data for alignment (i.e., datum driven alignment). If the 3D reference does not contain data for the area for which human operator 80 wants to use for alignment, HRI device 40 can be used to select points or regions in the subset of dimension data and additional scan iterations can be performed to capture missing data for the indicated points or regions.

At step 120, metrology 3D scanning app 30 can generate via processor(s) 25 a metrology scanning path 70 (see FIG. 4) and motion plan for robotic element 45 based on the preliminary scan data. In comparison to preliminary scan path 65, metrology scanning path 70 provides a scan path for robotic element 45 that can provide a more detailed scan of target object 50, for example, for inspection purposes. Metrology 3D scanning collects high-accuracy 3D measurement data across the overall dimensions, often at higher-resolution for more accurate representation of the object's shape, or a subset of the overall dimensions, sometimes with different varying tolerance requirement (i.e., allowed maximum deviation from the accurate representation or the 3D reference design) across different sections of the object. Metrology scanning path 70 is generated to perform the metrology 3D scanning, whose scan location and angle (i.e., the [X,Y,Z,W,P, R]) on the scan path and the motion across the scan path, for the sensors that capture measurement data even during motion, have to be well-defined to be optimally positioned from target object 50, compared to preliminary scan path 65. It is common for a sensor to have optimal settings to collect high-accuracy measurement data, often recommended by the OEM, such as optimal stand-off distance range between the scan location to the target dimension, field-of-view within which the target dimension should be, speed in which the sensor should be moving while scanning, and etc. When there are multiple scan locations on metrology scanning path 70, it is important for robotic element 45 to operate so its location, angle, and motion keeps being positioned optimally. A subset of this operation may not be reachable due to factors such as anticipated collision (e.g., an optimal scan location being within the collision zone), in which case, the preliminary scan process described above may disregard this subset operation while still being able to capture the sufficient preliminary scan data. On the other hand, for metrology scanning, finding an alternative operation to best-capture the target dimension which was originally planned to be measured by the collision-anticipated subset operation, may be required. Therefore, metrology scanning path typically requires iterative computing to identify optimal if not achievable, suboptimal operation (i.e., robotic element 45 executing locations, angles, and motion) to reach the dimension data appropriate for metrology applications.

Once metrology scanning path 70 has been generated, at step 125, metrology 3D scanning app 30 executes instructions via processor(s) 25 and communicates with robotic element 45 to move robotic element 45 within operating environment 60 according to metrology scanning path 70 and motion plan to scan target object 50. As robotic element 45 is moved according to metrology scanning path 70, metrology data is collected for target object 50 and stored in computer memory 20. Metrology data can be dimension data sufficient to be used for metrology applications. This dimension data may be the measurement data as-is or post-processed dimension data for metrology applications. For the quality inspection, the collected metrology data is accurate dimension data that locally meets the dimension-specific tolerance requirements for various dimensions (e.g., point location, line location, distance, flatness, GD&T, and etc.) or meets global tolerance across the subset of dimension data. For reverse engineering/re-engineering, the overall dimension should be collected without significantly missing dimensions as the application is ultimately to remanufacture a physical object starting from the measurement data. Therefore, higher resolution and coverage data is also desirable, so that can the measurement data be saved or converted in a watertight mesh format with minimal human inputs. With some post-processing, the watertight mesh data, which is another form of metrology data, can be directly inputted to a manufacturing process such as a 3D printing to manufacture a new physical object. Often, the metrology scanning app will perform an automated algorithmic qualification of metrology data, by looking at the density and distribution of points or mesh (e.g., for 3D point cloud data, certain characteristics indicate higher-accuracy, such as less distance between the points, more uniformly distributed points in their local proximity, and etc.)

Once metrology 3D scanning method 100 is complete and metrology scanning path 65 has been executed, the metrology data collected during the execution of metrology scanning path 65 can be used for a variety of purposes.

For example, metrology 3D scanning app 30 could generate sufficient metrology data including watertight mesh. Generating a watertight mesh can mean that the metrology 3D scanning app 30 directly outputs the watertight mesh. If metrology 3D scanning app 30 generates an incomplete measurement data that can be successfully saved in or converted to watertight mesh, human operator 80 can use HRI device 40 to select regions with missing dimension data to generate a complete watertight mesh. If some dimensions are still not measurable, the human operator may manually generate connecting surfaces between previously collected mesh to complete watertight mesh.

Another option is that the HRI data and the preliminary scan data can be selected as training data and input into an artificial intelligence (AI) algorithm for training an AI model to predict and recommend how alignment between dimension data and the 3D reference design should be performed (e.g., what corresponding point or feature should be selected as datum for alignment) or how the system should output sufficient preliminary scan data. The information contained in the training data on how insufficient preliminary scan data was improved to become sufficient using HRI data can be trained for an AI model using machine learning techniques such as imitation learning where the system emulates human operator's decision inputted by the HRI device improving the preliminary scan path in the first place. As a result, this AI can autonomously generate or recommend a successful alignment or sufficient preliminary scan path for the same or different object with the same design but positioned differently. By using techniques such as transfer learning or meta learning, the AI model can be trained to generate or recommend a sufficient preliminary scan data for another object with a different design using limited size of training data.

Another option is that the HRI data, the preliminary scan data, and possibly the metrology scanning path and motion data and the metrology scanning data, can be selected as training data and input into an artificial intelligence (AI) algorithm for training an AI model and the AI model is configured to output a more effective metrology scanning path and motion plan or sufficient metrology data including watertight completeness data for inspecting or manufacturing. Preliminary scan data augmented with an iterative HRI process will result in information on how the system can algorithmically generate sufficient preliminary scan data with complementary input from human operator 80 to execute an improved metrology scanning. This AI-generated preliminary scan data may at least output metrology scan data, yet it may not result in sufficient metrology data. In which case, a similar learning approach can be used to train an AI model to improve the metrology data using techniques such as imitation learning using the information on how the operator improved an insufficient metrology data (e.g., using HRI device to collect additional dimension data to watertight completeness). Furthermore, machine learning techniques such as reinforcement learning can be used as the iterative nature of preliminary scanning process, where insufficient is punished and augmentation is rewarded until metrology scanning is feasible based on the preliminary scan data. This closed loop of robotic sensing autonomous measuring and human augmenting the imperfect autonomously collected data (supervised autonomy) can be used for AI training to over time accomplish completely intelligent autonomy. Measurement data (the 3D reference design-point cloud or mesh) can be associated with the location/orientation of the robotic element 45. The human augmentation will be saved in the same format. In the future, when a similarly shaped object (by searching in the database shape to shape or by utilizing metadata such as part name/category), the simplified sensing or the complete 3D measurement program will predict what points or regions/areas will not be easily captured without multiple iterations or human augmentation, and so the AI will preempt the inefficiency by already applying augmentation to those sections.

Another option is that metrology 3D scanning app 30 can use the metrology data to determine if there are defects in target object 50, such as additive manufacturing (AM) quality issues, or if target object 50 requires maintenance or repair. Metrology 3D scanning app 30 can then be configured to create a visual representation of target object 50 with an indicator of the defects or the areas that require the maintenance or repair. For example, metrology 3D scanning app 30 can display the subset of metrology scan data with each point or mesh mapped in different colors based on the degree of defect (i.e., the deviation from the 3D reference design) on the HRI device 40 or on a display device of computing device 50. Once metrology data is collected, each point or mesh represents an accurate dimensional data of the overall or required subset of the target object. This metrology data can be compared to the 3D model after successful alignment, and then the two data can be compared to calculate the deviation as an example between each corresponding mesh or point which exists both on the dimensional data and the localized 3D model. The degree of deviation will be in range and various levels can be expressed in different colors representing varying degree of defect. Alternatively, the deviation itself can be visualized in a vector format as a line linking the two corresponding point or mesh. This results in deviation overlaid on top of the physical target object, enabling the human operator to perform additional operations such as inspection, repair/maintenance, or using HRI device to move the same or another robotic element to perform other tasks based on the deviation.

Another option is that metrology scanning path 70 and motion plan determined by metrology 3D scanning app 30 can be provided to a second robotic element for manipulation of another target object by the second robotic element.

Other options are also possible, such as: (1) comparing the metrology scan data to the reference design of the part to perform inspection of the object, which can be the part or tool/mold; (2) comparing the metrology scan data to the reference design of the part to perform inspection of the mold/tool that made the part; (3) the metrology scan data and the reference design and correct the tool or part (in which case) a very similar HRI process can be used, where the operator can as an example use the AR device to repair the tool by seeing the deviation data presented to provide HRI input to align the scan data with heat map or deviation data on top of the physical object to perform manual or robotic repair; etc.

While various embodiments have been described above, this disclosure is not intended to be limited thereto. Variations can be made to the disclosed embodiments that are still within the scope of the appended claims.

The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A metrology three-dimensional (3D) scanning system configured to generate scanning path and motion plans for specific objects using human-robot interaction (HRI), the metrology 3D scanning system comprising:
   a computer memory;
   one or more processors communicatively coupled to the computer memory, an HRI device, and a robotic element; and
   a metrology 3D scanning application (app) comprising computing instructions configured to execute on the one or more processors, the metrology 3D scanning app, when executed by the one or more processors, causing the one or more processors to:
      record HRI data as a human operator operates the HRI device;
      generate a preliminary scan path based on the HRI data for operating the robotic element within an operating environment;
      execute instructions to move the robotic element along at least a portion of the preliminary scan path and record, by the one or more processors into the computer memory, preliminary scan data comprising at least a subset of dimension data defining at least a target object;
      generate a metrology scanning path plan and a motion plan for the robotic element based on the preliminary scan data; and
      execute instructions to move the robotic element according to the metrology scanning path plan and the motion plan for scanning the target object, wherein the metrology scanning path plan and the motion plan, when implemented for scanning the target object, causes the robotic element to move within the operating environment.

2. The metrology 3D scanning system of claim 1, wherein the human operator operates the HRI device to define a collision zone in a proximity to the target object, wherein the collision zone comprises a 3D area that the robotic element should avoid physical entry into when operating within an operating environment and the preliminary scan path is generated for operating the robotic element within the operating environment while avoiding the collision zone.

3. The metrology 3D scanning system of claim 2, wherein the collision zone comprises a virtual near-net shape augmented reality (AR) bounding box that is generated via hand or gazing by the human operator using the HRI device and the HRI device comprises an AR device.

4. The metrology 3D scanning system of claim 1, wherein the HRI device comprises an augmented reality (AR) device.

5. The metrology 3D scanning system of claim 4, wherein the AR device renders a 3D representation of the target object on a display of the AR device, and wherein at least a portion of the 3D representation is marked as a missing or incomplete portion by the human operator, and wherein the missing or incomplete portion is added to the subset of dimension data defining the target object.

6. The metrology 3D scanning system of claim 1, wherein the metrology 3D scanning app is configured to generate a localized 3D model of the target object by aligning the subset of dimension data as defined in the preliminary scan data to a 3D model of the target object.

7. The metrology 3D scanning system of claim 6, wherein the 3D model comprises a 3D reference design.

8. The metrology 3D scanning system of claim 7, wherein a dilated surface around the target object is determined, wherein the dilated surface is a surface defined where a signed distance field to the target object is equal to a dilation distance, wherein a distance of a coordinate is a minimum distance to any surface of the target object.

9. The metrology 3D scanning system of claim 7, wherein aligning the subset of dimension data to a 3D reference design of the target object further comprises determination of an alignment deviation having an alignment preset threshold defining whether alignment between the subset of dimension data and the 3D reference design resulted in an alignment success or an alignment failure.

10. The metrology 3D scanning system of claim 9, wherein the alignment deviation compared to the alignment preset threshold indicates the alignment failure has occurred, and an additional 3D scan of the target object is captured and the additional 3D scan is used to align to the 3D reference design.

11. The metrology 3D scanning system of claim 9, wherein the alignment deviation compared to the alignment preset threshold indicates the alignment failure has occurred, and the human operator manipulates the HRI device to map points from the subset of dimension data and the 3D reference design to align the subset of dimension data and the 3D reference design.

12. The metrology 3D scanning system of claim 1, wherein scanning of the target object generates insufficient metrology scan data, and wherein the human operator manipulates the HRI device to collect additional metrology scanning data including generation of watertight mesh.

13. The metrology 3D scanning system of claim 1, wherein:
   the HRI data and the preliminary scan data are selected as training data for input into an artificial intelligence (AI) algorithm for training an AI model; and
   and the AI model is configured to output a more effective metrology scanning path and motion plan or sufficient metrology data including watertight completeness data for inspecting or manufacturing.

14. The metrology 3D scanning system of claim 1, wherein the metrology 3D scanning app is configured to determine defects of the target object after scanning of the target object.

15. The metrology 3D scanning system of claim 14, wherein the metrology 3D scanning app is configured to create a visual representation of the target object with an indicator of the defects.

16. The metrology 3D scanning system of claim 1, wherein the metrology 3D scanning app is configured to determine whether the target object requires maintenance or repair after scanning of the target object.

17. The metrology 3D scanning system of claim 16, wherein the metrology 3D scanning app is configured to create a visual representation of the target object with an indicator of the areas that require the maintenance or repair.

18. The metrology 3D scanning system of claim 1, wherein the metrology scanning path plan and the motion plan are provided to a second robotic element for scanning of the target object by the second robotic element.

19. A metrology three-dimensional (3D) scanning method for generating scanning path and motion plans for specific objects using human-robot interaction (HRI), the metrology 3D scanning method comprising:
   recording, by one or more processors, HRI data as a human operator operates an HRI device;
   generating, by the one or more processors, a preliminary scan path based on the HRI data for operating the robotic element within an operating environment;
   executing, by the one or more processors, instructions to move the robotic element along at least a portion of the preliminary scan path and record, by the one or more processors into a computer memory, preliminary scan data comprising at least a subset of dimension data defining at least a target object;
   generating, by the one or more processors, a metrology scanning path plan and a motion plan for the robotic element based on the preliminary scan data; and
   executing, by the one or more processors, instructions to move the robotic element according to the metrology scanning path plan and the motion plan for scanning the target object,
   wherein the metrology scanning path plan and the motion plan, when implemented for scanning the target object, causes the robotic element to move within the operating environment.

20. A tangible, non-transitory computer-readable medium storing instructions for generating scanning path and motion plans for specific objects using human-robot interaction (HRI), that when executed by one or more processors cause the one or more processors to:
   record HRI data as a human operator operates an HRI device;
   generate a preliminary scan path based on the HRI data for operating the robotic element within an operating environment;
   execute instructions to move the robotic element along at least a portion of the preliminary scan path and record, by the one or more processors into a computer memory, preliminary scan data comprising at least a subset of dimension data defining at least a target object;
   generate a metrology scanning path plan and a motion plan for the robotic element based on the preliminary scan data; and
   execute instructions to move the robotic element according to the metrology scanning path plan and the motion plan for scanning the target object,
   wherein the metrology scanning path plan and the motion plan, when implemented for scanning the target object, causes the robotic element to move within the operating environment.

* * * * *